UNITED STATES PATENT OFFICE.

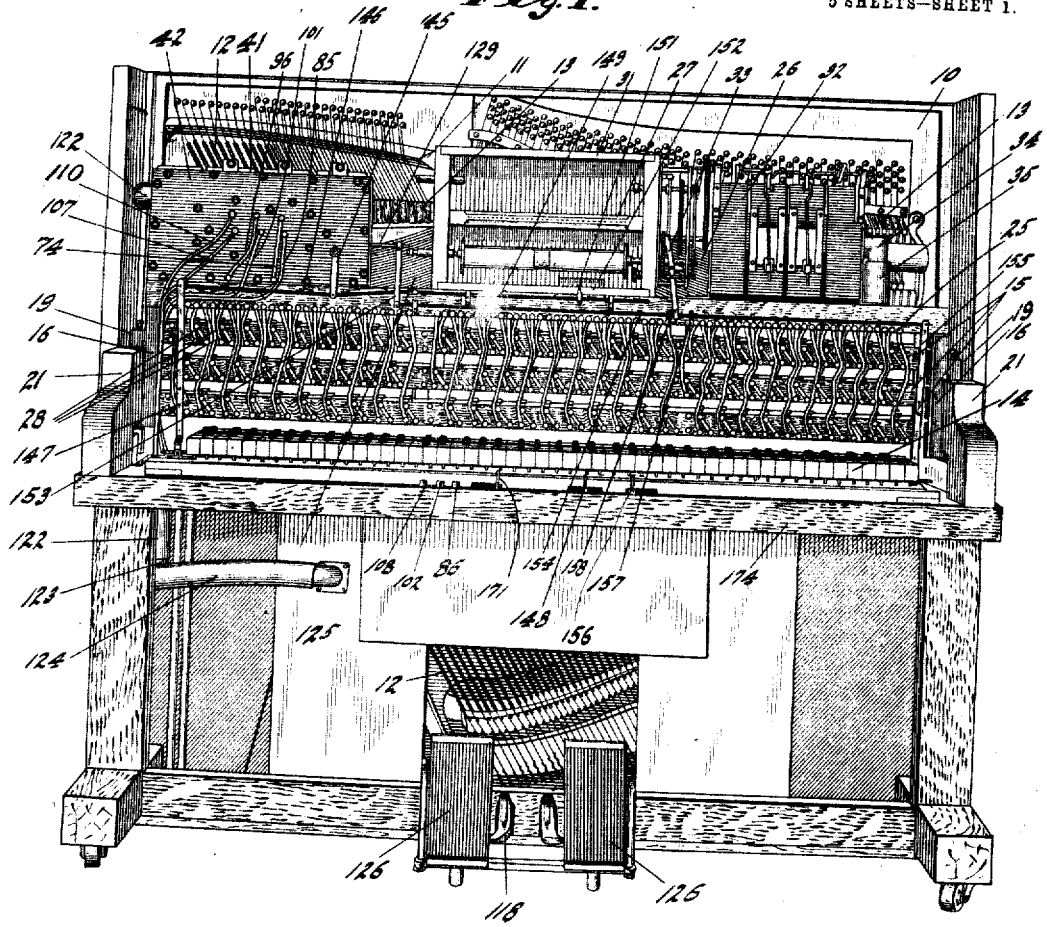

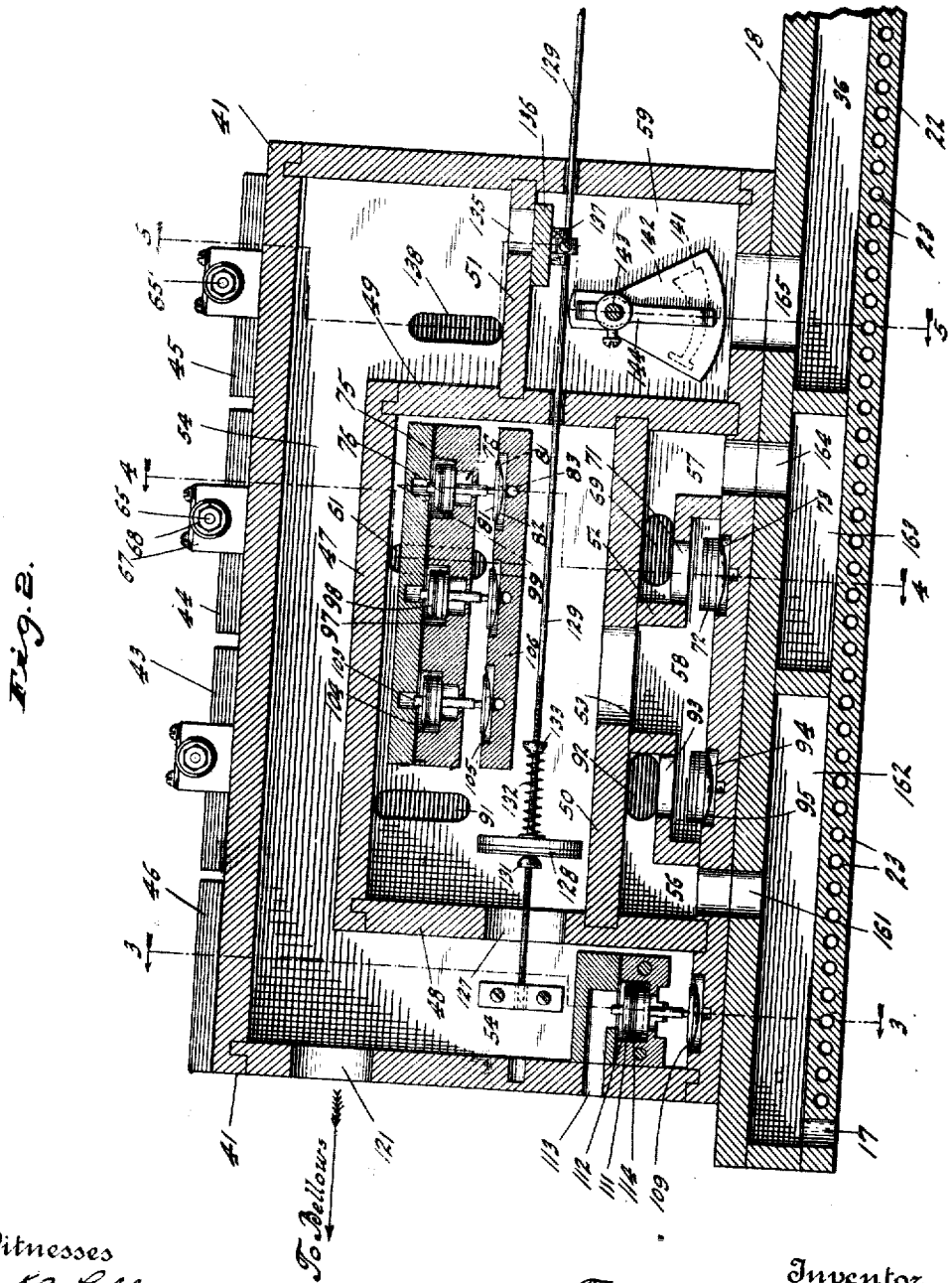

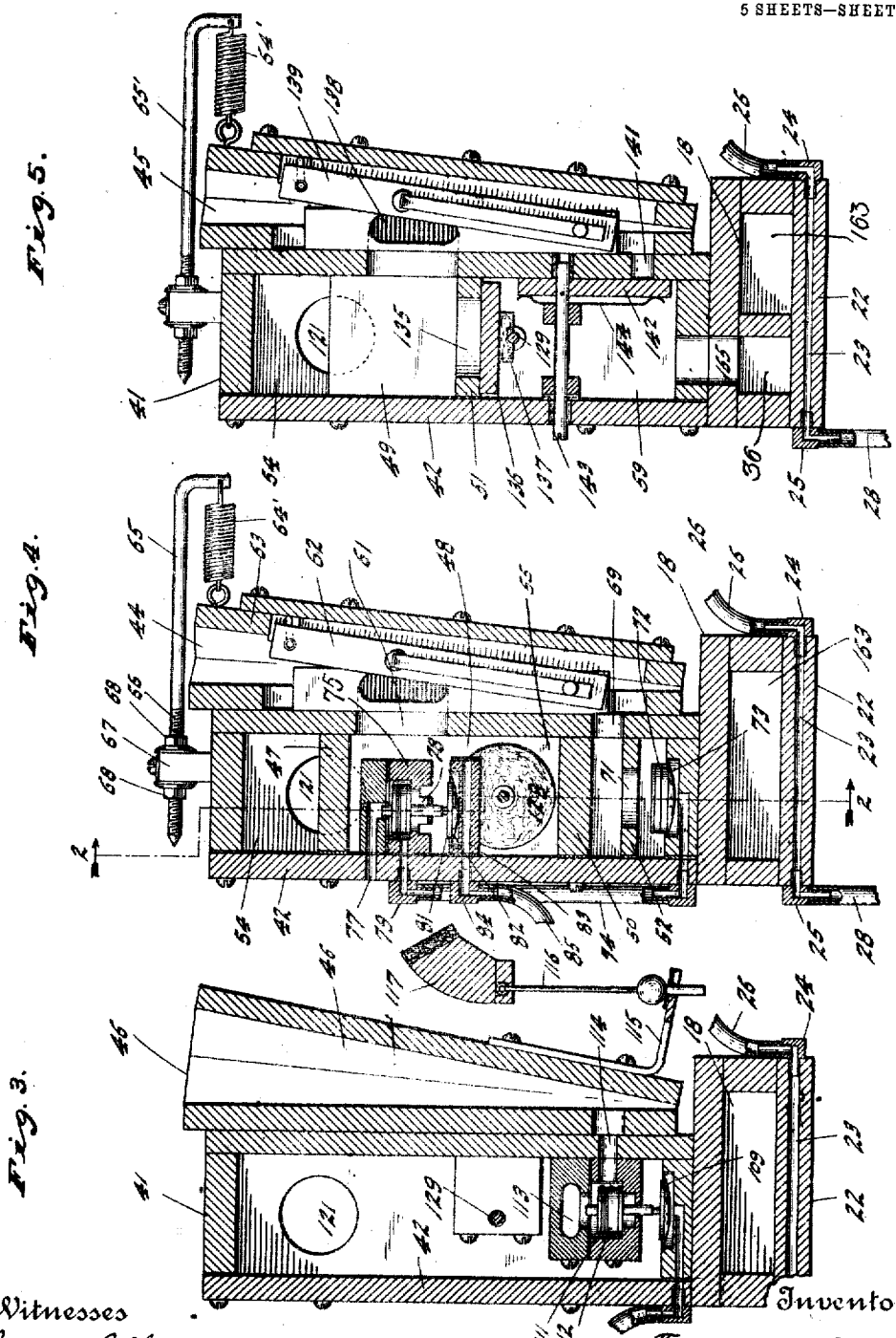

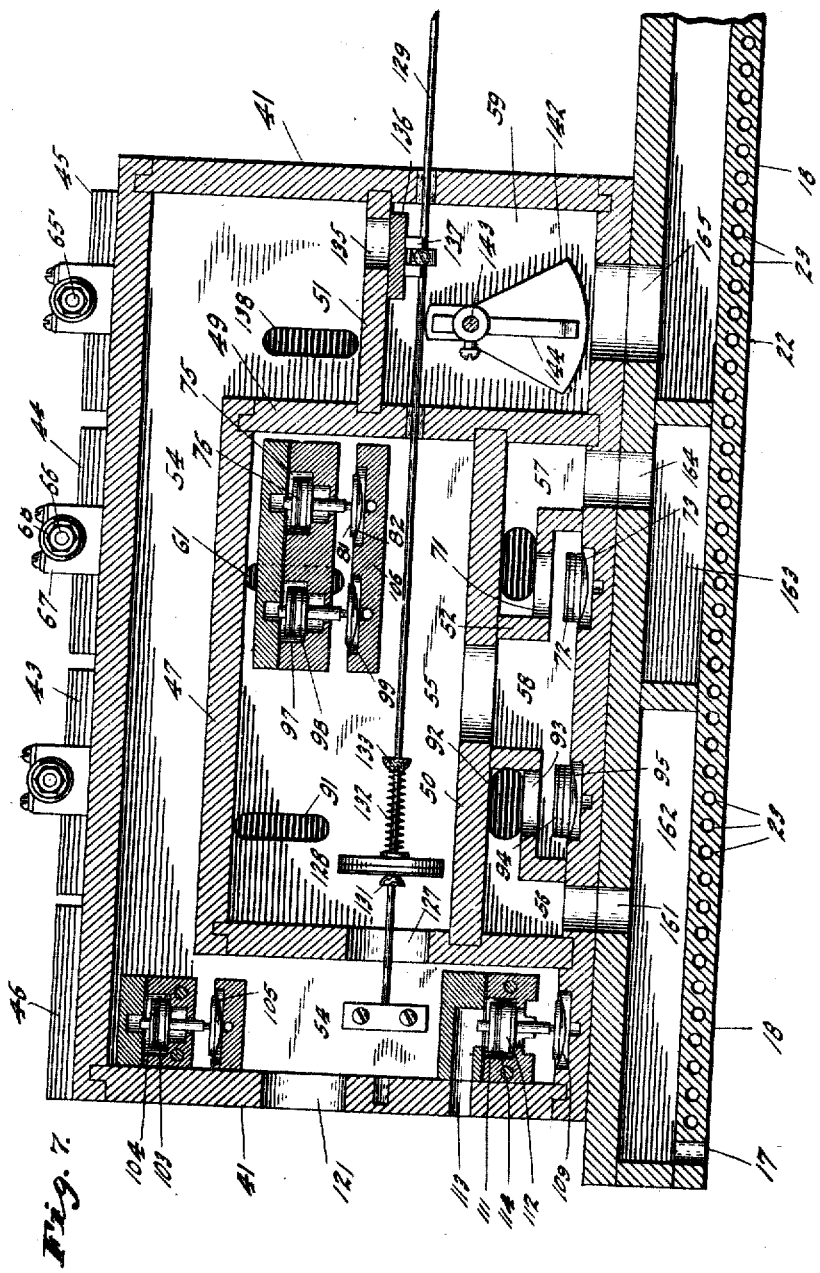

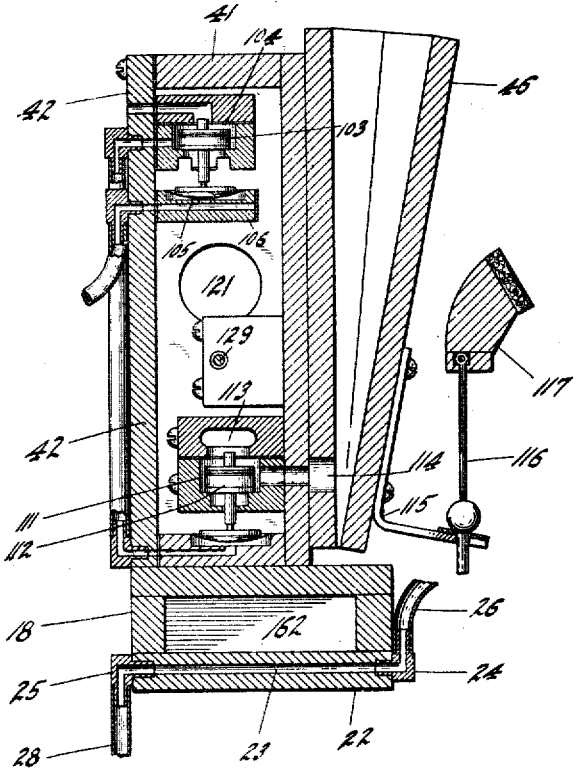
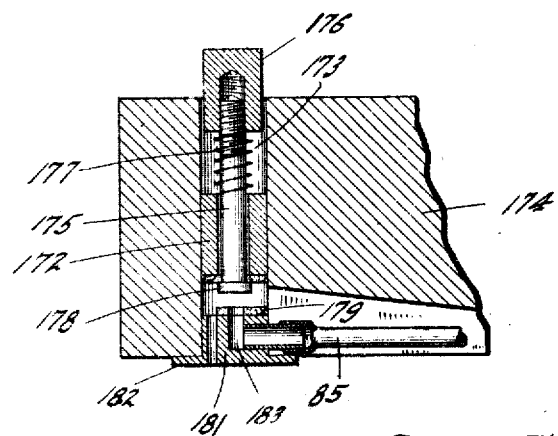

FRANCIS W. DRAPER, OF RICHMOND, INDIANA, ASSIGNOR TO STARR PIANO COMPANY, OF RICHMOND, INDIANA, A CORPORATION OF INDIANA.

PNEUMATIC PLAYER MECHANISM.

1,016,917.    Specification of Letters Patent.    Patented Feb. 6, 1912.

Application filed August 24, 1910. Serial No. 578,780.

*To all whom it may concern:*

Be it known that I, FRANCIS W. DRAPER, a citizen of the United States, residing at Richmond, in the county of Wayne and State of Indiana, have invented a new and useful Pneumatic Player Mechanism, of which the following is a specification.

The object of my invention is to so arrange the various elements in a piano player mechanism that all of the pneumatic mechanism by means of which the "expression" is controlled, will be readily accessible by the removal of a single cover.

The accompanying drawings illustrate my invention.

Figure 1 is a perspective view of a player piano constructed in accordance with my invention; Fig. 2 a section of the controller box on line 2, 2 of Fig. 4; Fig. 3 a section on line 3, 3 of Fig. 2; Fig. 4 a section on line 4, 4 of Fig. 2; Fig. 5 a section on line 5, 5 of Fig. 2; Fig. 6 an under plan of the main transverse wind trunk with the bottom board removed; Fig. 7 a section similar to Fig. 2 showing a slightly modified arrangement; Fig. 8 a section on line 8, 8 of Fig. 7, and Fig. 9 a section of one of the flushing valves.

In the drawings, 10 indicates the usual inclosing casing of the piano provided with the usual harp 11 and strings 12, action 13 and finger keys 14. The pneumatic actions (preferably comprising primary, secondary, and power pneumatics,) act upon the piano actions 13 in any desired manner and are arranged in several horizontal series carried by transverse action trunks 15, these several trunks being connected at their opposite ends to vertical wind trunks 16—16 which, at their tops, are connected through openings 17—17 with a main transverse wind trunk 18. These several parts are firmly, though detachably connected together to form a unitary structure, the parts of which may be disassembled only by first removing the structure as a whole from the piano casing. Each of the vertical trunks 16 is provided with an outwardly projecting ledge 19 adapted to rest upon the upper edge of the side rail 21 of the casing 10.

The bottom board 22 of trunk 18 is transversely pierced by a plurality of passages 23, one for each tracker board opening and mounted in opposite ends of each passage 23 are two nipples 24 and 25. Each nipple 24 is connected by a tube 26, which may conveniently be flexible as usual, with an opening in the tracker board 27, and each nipple 25 is connected by a tube 28 with a similar nipple 29 which leads to the pouch of the primary pneumatic.

Mounted upon the top of the main transverse wind trunk 18, at about its middle, is the open faced box 31 which carries the tracker board 27 and the associated sheet winding spindles, said associated sheet winding spindles being driven in a well known manner, in either direction, by means of a wind motor 32 which is also supported upon the top of the wind trunk 18 and connected to the sheet driving spindle by reversing gearing of any well known form controlled by a shifting lever or other controlling member 33. The main wind trunk 34 of the motor is connected by a readily detachable flexible connection 35 with the main chamber 36 of the wind trunk 18. Mounted upon the opposite end of the top of wind trunk 18 is the expression controller box 41, one side of which is closed by a readily removable cover board 42. Mounted upon the rear of box 41 is a bass controller 43, a treble controller 44, a motor controller 45 and an action rail controller 46. Arranged within box 41 are partitions 47, 48, 49, 50, 51, 52, and 53 which divide the interior of said box to form a chamber 54, a main expression controller chamber 55, a bass passage 56, a treble passage 57, an intermediate passage 58 and a motor controlling chamber 59. Leading from the main controller chamber 55 into the treble controller 44 is a passage 61 which is controlled by a valve 62 connected with the movable member 63 of the treble controller 44 which treble controller is in the form of an ordinary bellows pneumatic, the movable member of which is normally urged in one direction by means of a spring 64 one end of which is carried by a stem 65 threaded at 66 and passed through a support 67 secured to the upper wall of box 41, a pair of nuts 68, 68 serving to hold the stem in any desired position of adjustment, so as to adjust the tension of the spring. Leading from the interior of the controller 44 into passage 57 is a passage 69. Leading through a horizontal portion of partition 52 so as to form a communicating passage between passages 58 and 57, is a passage 71 which may be closed by means of a valve 72 which normally, by reason of its own weight, lies in position to leave passage 71 open.

The valve 72 rests upon and is controlled by a pouch pneumatic 73, the pocket of which is formed in the bottom board of box 41 and this pocket is connected by a tube 74 with the chamber 75 of a primary valve 76 which is in communication with atmosphere through a passage 77 and with the interior of chamber 55 through passage 78, in the usual well known manner. The tube 74 connects with a nipple 79, the passage of which leads into the valve chamber 75. Valve 75 is controlled by a button 81 which rests upon the pouch pneumatic 82, the pocket of which is connected by a passage 83, nipple 84 and tube 85 with a flushing valve 86 which is normally open and arranged in front of the keys 14 within easy access of the operator. Similarly a passage 91 leads from chamber 55 into the interior of controller 43 and at its inner end is controlled in size by a valve like valve 62 carried by the movable member of the controller. The passage 92 forms a communication between the interior of the controller 43 and passage 56, and a passage 93, through partition 53, forms a communication between passages 58 and 56. A valve 94, like valve 72, is arranged to control passage 93 and this valve 94 is controlled by a pouch pneumatic 95 like the pneumatic 73, said pneumatic being connected by a tube 96 with the valve chamber 97 of a valve 98 which is like valve 76 and is controlled by a primary pouch pneumatic 99 which is like the pneumatic 82 and is connected by a tube 101 with a flushing valve 102 like, and arranged alongside of, flushing valve 86.

The primary valve 103 is mounted in a valve chamber 104 which is formed in the same board in which the valve chambers 75 and 97 are formed and this board is, for convenience, secured upon the inner face of the cover board 42 so that it will be removed therewith. The valve 103 is controlled by pouch pneumatic 105, the pocket of which is formed in the same board 106 in which the primary pneumatic pockets for the pouch pneumatics 82 and 99 are formed and this board also is secured to the inner face of cover 41. The pocket of pneumatic 105 is connected by a tube 107 with a flushing valve 108 which is like, and arranged alongside of, flushing valves 102 and 86. Chamber 104 is connected by a tube 110 with the pocket of a pouch pneumatic 109 which is formed in the chamber 54 of box 41. Mounted in this main chamber is a valve chamber 111 within which is mounted a valve 112 controlled by the pouch pneumatic 109 and this valve chamber is connected with atmosphere by a passage 113 and is connected to the interior of the soft pedal actuator 46 by a passage 114. The soft pedal actuator is connected by a bracket 115 and the pedal rod 116 with the hammer rail 117, which is operated by the pedal rod 116 in only one direction so that the said rod is free to be actuated by the usual pedal 118 in an ordinary manner.

The main passage 121 leads from the main chamber 54 of box 41 and is connected by a pipe 122 which is readily detachable from a fitting 123 connected by a pipe 124 with the vacuum chamber 125, the vacuum in which is maintained by the usual pedals 126, and bellows not shown.

Leading through partition 48 and, forming the only communication between the main chamber 54 and chamber 55, is a passage 127 which may be opened or closed by a valve 128 carried by a valve rod 129 reciprocably mounted in the box 41, and in the present instance, passing through chambers 55 and 59. Valve 128 is slidably mounted upon rod 129 and is normally yieldingly urged against an adjustable nut 131 by means of a spring 132, the tension of which may be adjusted by a nut 133. The nuts 131 and 133 are mounted upon suitably formed threads on rod 129, the arrangement being such that the rod 129 may have a limited play through the valve 128 after said valve has been brought into position to close passage 127.

Leading through partition 51 and forming a direct connection between the main chamber of box 41 and the motor chamber 59, is a passage 135 which may be opened and closed by the reroll valve 136 connected by a suitable rider 137 with rod 129, this valve being so arranged that it will close passage 135 when valve 128 is away from passage 127.

Leading from the chamber 54 of box 41 into the interior of the motor controller 45 is a passage 138, the size of which may be controlled by a valve 139 which is similar to valve 62 and is connected to the movable member of the controller 45, as clearly shown in Fig. 5. This movable member of the controller 45 is moved in one direction by means of a spring 64' which is like spring 64 and is carried by an adjustable stem 65'.

Leading from the interior of controller 45 into the chamber 59 is a passage 141 which is preferably of the form shown in dotted lines in Fig. 2, the initial end being comparatively wide and short and having a continuation which is comparatively narrow and gradually widens throughout its length. Mounted within chamber 59 so as to cover the pressure side of passage 141 is a motor-controlling valve 142 which is keyed to a rock shaft 143 journaled in suitable bearings in the cover board 42 and in the rear board of box 41, the last mentioned mounting being readily longitudinally separable, as shown in Fig. 5, so that the shaft 143 will be withdrawn with the cover 41. Valve 142 has a slight longitudinal play upon the rock shaft 143 and is yieldingly urged to a seat against the pressure side of passage 141 by means of a light spring 144. The outer end of shaft 143 is projected beyond the outer face of cover 42 and secured to this projected end is a lever 145 by means of which the valve 142 may be adjusted relative to passage 141 and thus control the velocity of air which may be drawn at any particular time by the bellows from the motor so as to thus control the speed of the motor.

Lever 145 is connected by a link 146 to a lever 147 connected in any suitable and common manner with a controlling lever 148 which is arranged at the front of the key bed and this link 146 is connected with the rod 49 slidably mounted in suitable bearings as shown in Fig. 1 and provided with a pointer 151 arranged to traverse a tempo scale 152 mounted within sight within the tracker board box 31.

Rod 129 is projected through one of the end boards of box 41 as clearly shown in Figs. 1 and 2, and to this projected end is secured an arm 153 which is connected to a rod 154 slidably mounted in suitable bearings on the front of the upper wind trunk 18 and this rod is connected by a lever 155 and any ordinary and usual intermediate connections with a roll controlling lever 156 mounted at the front of the key board. Rod 154 carries a pair of separated collars 157 and 158 and between which the driving gear controlling lever 33 is extended, the said collars being sufficiently separated so that valves 128 and 136 may be moved from open to closed position and vice versa without causing any action of lever 33, which serves to reverse the action of the motor on the music sheet.

Passage 56 communicates through a passage 161 with a chamber 162 formed within the transverse wind trunk 18 and this chamber 162 communicates with the one of the passages 17 which communicates with the lefthand vertical wind trunk 16. The other passage 17, which communicates with the righthand vertical wind trunk 16, communicates with a chamber 163 which is formed within the wind trunk 18 and is connected with passage 57 by means of a passage 164. Each of the action wind trunks 15 is divided at an intermediate point in its length in the usual manner by a cross partition so as to separate the bass from the treble actions. This partition is not shown because it is very common and its exact position in the wind trunk will depend entirely upon the line of division which is desired between bass and treble. The passage 165 forms the communication between chamber 36 of trunk 18 and the motor chamber 59 of box 41.

In the form shown in Fig. 2, the primary valves 76, 98 and 103 are all arranged in a single structure mounted within the chamber 55 and this is done for convenience in manufacture. With such an arrangement, however, there is an unavoidable actuation of the soft pedal controller 46 whenever valve 128 is closed and, while this does not produce any result so far as the production of music is concerned, it may possibly be objectionable to some manufacturers. This difficulty can be readily avoided by making the arrangement shown in Figs. 7 and 8, the primary valve 103 and its operating primary pneumatic being transferred into main chamber 54.

The operation is as follows: The entire pneumatic action, including the action trunks, the primary, secondary, and power pneumatics, the tracker board and sheet driving mechanism and motor, and the expression controlling actions are assembled as a unitary structure, as clearly indicated in Fig. 1, this structure being entirely above the key bed and supported in position by the ledges 19. In order to remove this entire mechanism as a whole from the piano case, it is merely necessary to withdraw the lower end of the rubber tubing 122 from the fitting 123 and withdraw the retaining screws which pass through the ledges 19.

It is not often that repairs need to be made to the primary, secondary and power pneumatics of the pneumatic action proper, but adjustments to the expression mechanism are not uncommon and by my arrangement it will be noticed that all of this expression mechanism, i. e., the motor controller, the bass and treble controllers, and the soft pedal controller, are all brought together into the single box 41 so that the removal of the single cover 42 lays all of this mechanism open for inspection, repair and adjustment. This box is above the key bed and readily accessible by removal of the usual front panel of the piano case.

The usual sustaining pedal of the piano may be operated by a lever 171 which is brought to a point in front of the key bed and the connection between this lever and the sustaining pedal mechanism may be entirely a mechanical one, although it will be readily understood that, if desired, the sustaining pedal mechanism might be operated by a pneumatic like the pneumatic 46 in which case box 41 would need to be somewhat enlarged so that the sustaining pedal operating pneumatic might be mounted in connection therewith in the same way that pneumatic 46 is mounted and in that case, of course, primary and secondary pneumatics and valves like the primary 103 and secondary 112 would be provided, and a flushing valve like flushing valve 108 would be provided instead of lever 171.

All of the flushing valves 86, 102 and 108 are alike and illustrated in Fig. 9. Each of these flushing valves consists of a main body bushing 172 which fits tightly within a vertical bore 173 formed in the key bed 174. This bushing 172 is centrally bored so as to permit the free vertical play of a valve stem 175 which carries a finger button 176 threaded upon its upper end, a light spring 177 being arranged between the bushing 172 and the button 176 so as to normally hold the parts in the position indicated in Fig. 9. The lower end of stem 175 is engaged to form a valve head 178 which, upon depression of the stem 175 comes down upon the valve seat 179 which is carried by the upper end of a head 181 which is inserted into the lower end of bore 173, a flange 182 determining the position in the bore. Running through seat 179 and through head 181 is an L-shaped bore or air passage 183 to which is connected one of the tubes 85, 101 or 147. The parts are indicated in their normal condition when none of the structure is in action. So soon as pedals 126 are operated, a vacuum will be produced in the chest 125 and consequently in chambers 54 and 55, passages 58, 56 and 57, wind trunk 18 and action trunks 15, and consequently the pouch pneumatics 82, 99 and 105, which are in communication with atmosphere because of their normally opened valves 86, 102 and 108, will swell up so as to close the communications between atmosphere and the chambers of the primary valves 76, 98 and 103 and these valves will remain in this position so long as the flushing valves 86, 102 and 108 are not touched. The reroll valve 136 is over opening 135 and the lever 33 is therefore in such position as to connect the motor with the sheet winding mechanism in such way as to drive the same forward. In order to start the motor, the operator will shift lever 148 to the left thus swinging lever 145 so as to swing valve 142 to the right in Fig. 2. This will open opening 141 to a greater or lesser extent and the air from the motor will have to pass through this opening into the motor controller 45 and thence through passage 138 into chamber 54 and from thence to the bellows, the speed of the motor being determined by the position of valve 142, and the controller 45 opening and closing the valve 138 automatically to compensate for differences in vacuum produced by the bellows, in the usual manner.

It is often desirable to skip portions of a perforated music sheet and it has heretofore been proposed to make such skipping possible by providing a cover for the tracker board so as to prevent ingress of air as the perforated portions of the music sheet pass over the tracker board, but such an arrangement is objectionable because of the clumsy appearance of the cover and because of the improper wear upon the music sheet. In order to accomplish this result, therefore, the collars 157 and 158 on rod 154 are spaced far enough apart to permit a closing of valve 128 and an opening of valve 136 without any movement of lever 33 when it is in position to produce forward movement of the sheet driving mechanism. By this arrangement further exhaustion of air from the pneumatic action trunks is prevented and a direct connection is made between the bellows and motor, thus cutting out or short-circuiting the motor controller 45 so as to drive the motor ahead at full speed, and consequently drive the music sheet ahead at full speed but, there being no suction upon the primary valve chambers which communicate with the tracker board, there will, of course, be no actuation of the pneumatic action. This position of parts is obtained by an intermediate position of the reroll lever 156. Further movement of the lever in reroll direction brings collar 157 into engagement with lever 33 so as to reverse the driving train, the spring 132 permitting this action of rod 129 while valve 128 is kept closed over passage 127.

Whenever either one of the flushing valves 86 or 102 is closed, the corresponding primary pneumatic 82 or 99 will be deflated by reason of the bleed hole, which is provided for it in the ordinary manner, and the primary valve will thus drop so as to flush the corresponding secondary valve 73 or 95 and thus bring the corresponding valve 72 or 94 into position to cover the corresponding passage 71 or 93 and thus cause either the bass or the treble end of the action trunks to be exhausted by passage of air through the corresponding controller 44 or 43 thus reducing the force exerted on the hammers. The action of these controllers is now well understood and it is thought that they need no further description.

Actuation of the pneumatic 46, in order to shift the soft pedal rail is obtained by actuation of the flushing valve 108, this flushing valve serving to cause a deflation of pneumatic 105 and a corresponding drop of valve 103 which, in turn, causes an inflation of the secondary pneumatic 109 and a rise of valve 112 so as to disconnect the pneumatic 46 from atmosphere and connect it to the interior of chamber 54.

The term "bellows" as used in the specification and claims in intended to designate a wind current producing mechanism of such character that a tendency of flow of air from one point of the system to another will be produced.

Certain of the features shown but not claimed in this application are claimed in my co-pending applications Serial Nos. 616,348 and 616,349 filed, March 23, 1911; which applications are divisions of this application.

I claim as my invention:

1. In a pneumatic player mechanism, an expression box having interior partitions arranged therein to form a main chamber, a motor chamber, an expression chamber, and branches leading from said expression chamber to pneumatic action mechanism, pneumatic controllers carried by said box one for each branch from the expression chamber to the pneumatic action, each of said controllers communicating with the expression chamber and a branch therefrom, a direct connection between the expression chamber and each branch, a valve for opening and closing said direct connection, pneumatic valve mechanism for operating each of said valves, a pneumatic motor-controller forming a connection between the main chamber and motor chamber, a valve independent of the pneumatic controller for regulating the size of the passage through the said controller between the main chamber and motor chamber, a direct connection between the main chamber and motor chamber, a valve controlling said direct connection, a connection between the main chamber and the expression chamber, a valve for controlling said connection, and a valve stem carrying said last mentioned valve and the valve controlling the direct connection between the main chamber and motor chamber, the valve for controlling the connection between the main chamber and expression chamber having a spring connection with the valve stem, whereby said valve stem may have a limited play independent of the spring-connected valve.

2. In a pneumatic player mechanism, an expression box having interior partitions arranged therein to form a main chamber, a motor chamber, an expression chamber, and branches leading from said expression chamber to pneumatic action mechanism, pneumatic controllers carried by said box one for each branch from the expression chamber to the pneumatic action, each of said controllers communicating with the expression chamber and a branch therefrom, a direct connection between the expression chamber and each branch, a valve for opening and closing said direct connection, pneumatic valve mechanism for operating each of said valves, a pneumatic motor-controller forming a connection between the main chamber and motor chamber, a valve independent of the pneumatic controller for regulating the size of the passage through the said controller between the main chamber and motor chamber, a direct connection between the main chamber and motor chamber, a valve controlling said direct connection, a connection between the main chamber and the expression chamber and a valve for controlling said connection.

3. In a pneumatic player mechanism, an expression box having interior partitions arranged therein to form a main chamber, a motor chamber, an expression chamber, and branches leading from said expression chamber to pneumatic action mechanism, pneumatic controllers carried by said box one for each branch from the expression chamber to the pneumatic action, each of said controllers communicating with the expression chamber and a branch therefrom, a direct connection between the expression chamber and each branch, a valve for opening and closing said direct connection, pneumatic valve mechanism for operating each of said valves, a pneumatic motor-controller forming a connection between the main chamber and motor chamber, a valve independent of the pneumatic controller for regulating the size of the passage through the said controller between the main chamber and motor chamber, a direct connection between the main chamber and motor chamber, a valve controlling said direct connection, a connection between the main chamber and the expression chamber, a valve for controlling said connection, and a valve stem carrying said last mentioned valve and the valve controlling the direct connection between the main chamber and motor chamber.

In witness whereof, I, FRANCIS W. DRAPER, have hereunto set my hand and seal at Richmond, Indiana, this 13th day of August, A. D. one thousand nine hundred and ten.

FRANCIS W. DRAPER. [L. S.]

Witnesses:
CLARK D. KANOUSE,
ARNOLD E. PFEIFFER.